United States Patent
Lewis et al.

(10) Patent No.: US 10,970,681 B2
(45) Date of Patent: Apr. 6, 2021

(54) CAMERA GESTURE CLOCK IN

(71) Applicant: Walmart Apollo, LLC, Bentonville, AR (US)

(72) Inventors: Steven Lewis, Bentonville, AR (US); Nicholaus Adam Jones, Fayetteville, AR (US); Matthew Dwain Biermann, Fayetteville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 452 days.

(21) Appl. No.: 15/690,695

(22) Filed: Aug. 30, 2017

(65) Prior Publication Data

US 2018/0089630 A1 Mar. 29, 2018

Related U.S. Application Data

(60) Provisional application No. 62/401,449, filed on Sep. 29, 2016.

(51) Int. Cl.
*G06Q 10/10* (2012.01)
*G06Q 40/00* (2012.01)

(52) U.S. Cl.
CPC ....... *G06Q 10/1091* (2013.01); *G06Q 40/125* (2013.12)

(58) Field of Classification Search
None
See application file for complete search history.

(56) References Cited

U.S. PATENT DOCUMENTS

| | | | |
|---|---|---|---|
| 6,950,534 B2* | 9/2005 | Cohen | G06F 3/017 382/103 |
| 7,404,086 B2* | 7/2008 | Sands | G06F 21/32 713/186 |
| 7,864,987 B2 | 1/2011 | Venkatanna et al. | |
| 8,261,090 B1 | 9/2012 | Matsuoka | |
| 8,824,749 B2 | 9/2014 | Leyvand et al. | |

(Continued)

FOREIGN PATENT DOCUMENTS

CN 103714282 A 4/2014

OTHER PUBLICATIONS

Compumatictime, "Compumatic CFR-20/20 Face Recognition Biometric Time Clock," YouTube.com, Mar. 19, 2014.

*Primary Examiner* — Paul Danneman
(74) *Attorney, Agent, or Firm* — Schmeiser, Olsen & Watts LLP; Lawrence P. Zale

(57) ABSTRACT

A system for keeping track of an employee's attendance is described that allows the employee to be creative which also helps morale. An employee sets up an employee account and provides identification. A full body image is taken of the employee that is analyzed. Facial features may also be analyzed and stored. The employee then can create his/her own unique gesture which is captured and stored as a unique clock in gesture. He/she may also set up passwords and/or security questions if the gesture is not recognized. The employee then performs the unique clock in gesture to notify the system when he/she is beginning or leaving work. During clock in, the system checks human resource rules, accumulated work hours and characteristics of the employee's employment and clocks in the employee if it determines that the employee meets the rules and is allowed to clock in and work additional hours.

17 Claims, 3 Drawing Sheets

(56) References Cited

U.S. PATENT DOCUMENTS

| | | |
|---|---|---|
| 8,924,735 B2 | 12/2014 | Forbes et al. |
| 8,970,569 B2 | 3/2015 | Vilcovsky et al. |
| 9,032,510 B2 | 5/2015 | Sampathkumaran et al. |
| 9,089,270 B2 | 7/2015 | Song et al. |
| 9,244,533 B2 | 1/2016 | Friend et al. |
| 2003/0156756 A1* | 8/2003 | Gokturk ............... G06F 3/017 382/190 |
| 2011/0082777 A1* | 4/2011 | Chess ............... G06Q 10/1091 705/32 |
| 2014/0015930 A1 | 1/2014 | Sengupta |

* cited by examiner

CAMERA GESTURE CLOCK IN

RELATED APPLICATIONS

This application claims the benefit of U.S. Provisional Patent No. 62/401,449, filed Sep. 29, 2016, entitled "Camera Gesture Clock In," the contents of which are incorporated by reference herein in their entirety.

FIELD

Aspects of the present invention relate to a system for keeping track of when each employee begins and ends work and more specifically to a more accurate and entertaining system for keeping track of when an employee begins and ends work.

BACKGROUND

An entity, such as an employer must keep track of when personnel, such as employees, subcontractors, and others working on the premises (collectively referred to as "employees") arrive at a work location and when they leave a work location. This may be for a number of reasons. The most common reason is that employees are paid on an hourly basis which is based upon when they check in to begin work ("clock in"), and when they check out indicating that they have ended a shift, or a portion of the shift ("clock out"). Typically, the employee is paid for the time between clock in and clock out.

Employers must also keep track of clock in and clock out of employees to account for them in case of emergency or disaster. Information about employees that have clocked in but have not clocked out, and are possibly on the premises, may be used to aid emergency personnel in finding and rescuing employees.

Employees may also clock out for lunch, then clock in again after lunch, depending upon their employment agreement. In some cases, employees must clock out if they are driving to another location or going on a business trip. In any case, employees clock in and out at least twice a working day, and in some cases several times more.

Typically clocking in or clocking out will involve presenting some form of identification to a reader which would identify the employee, then determine if the employee was clocking in or clocking out and store this information along with an official time and date. In some cases, the identification would be a card given to the employee.

A system with a card for identification can be inaccurate. If someone brought in a card of an employee and clocked the card in and then later clocked the card out, it would appear that the employee associated with the card was present and worked that day.

There also have been various types of identification which use visual recognition, such as facial recognition of the employee. Even though this is fairly accurate, it can be time-consuming. Therefore, if a number of employees are entering or leaving at the same time, it can cause long lines and frustration for the employees.

Since the employees clock in and clock out often, and the process is very repetitive and mundane, it can become quite boring. This routine can contribute to a loss of morale.

Currently, there is a need for a system which quickly clocks employees in or out that is accurate and allows the employee to be creative.

BRIEF SUMMARY

According to aspects of the present inventive concepts there is provided an apparatus and method as set forth in the appended claims. Other features of the inventive concepts will be apparent from the dependent claims, and the description which follows.

The claimed invention allows employees to clock in or out in an easier, more entertaining manner and more accurate manner as compared with current clock in systems. During an initialization phase, the employee proves his/her identity and provides information to create an employee profile. A whole body image is captured of the employee and analyzed. It also performs biometric analyses such as face analysis. All of the information is stored in the employee profile.

Once the employee profile has been created, the employee creates a personalized, custom pose or gesture that is captured by a camera. This gesture is analyzed and broken down to readily recognizable elements and stored in the employee profile.

When the employee is ready to clock in or out of the system, he/she steps in front of the system camera and performs his/her custom pose. The camera will match this pose to those previously stored and identify a matching pose. If there are no matching poses, the employee is allowed to make the gesture again which is also analyzed and matched. This is allowed to be repeated a predetermined number of times before the system tries alternative methods of identification such as full-body identification, or biometric identification, such as face recognition or a combination of several types of identification. Other types of non-visual identification may be used such as usernames/passwords or security questions.

If there is more than one gesture found that is similar to the acquired gesture and the employee cannot be uniquely identified, then the system may drop back to full-body recognition, face recognition or security questions for accurate identification. Once the employee 1 is identified, the system will know if he/she is already clocked in, and if so, would be clocking out. If the system determines that employee 1 is not clocked in, then the system checks human resource rules to determine if the employee is eligible to be clocked in. If so, the official time, date and other clock in information is then stored for employee 1.

The current invention may be embodied as an employee timekeeping system for keeping track of the time worked by an employee, having an image acquisition device adapted to acquire at least one full-body image of an employee during a predetermined acquisition window, an image analysis device adapted to receive the at least one acquired full-body image and determine features in the acquired images, and a timekeeping device for providing a date and time when the images were acquired. It also includes an image database having a plurality of prestored features of images each associated with an employee, a time and attendance database for storing when each employee started and ended work, and a controller. The controller is coupled to the image acquisition device, the analysis device, the image database and the time and attendance database. The controller is adapted to receive the images acquired from the image acquisition device, receive a date and time from the timekeeping device when the images were acquired, provide the images to the image analysis device, receive a set of features from image analysis device, search the image database for similar sets of features, and determine if there is a match. A match is defined as being closer than a predetermined error. Once a match is found, the prestored profile of the employee associated with the matching features is acquired. If the employee is clocking in, and is allowed to clock in, the identification of the employee and the date/time of the image acquisition are stored in the time and attendance database.

The system according to one embodiment of the current invention may also be described as a method of keeping track of the work time of an employee comprising the steps of determining if an employee profile has been stored, and if not, then, acquiring identification information identifying the employee, storing it as an employee profile, acquiring full-body images of the employee, analyzing the acquired full-body images to define features, associating the defined features with the employee profile, having the employee perform a gesture, acquiring images of the gesture, and analyzing the acquired images for features. The analyzed features are then stored in the employee profile.

The current invention may also be embodied as an employee timekeeping system for keeping track of the work time of an employee having an image acquisition device adapted to acquire at least one full-body image of an employee during a predetermined acquisition window, a timekeeping device for providing a date and time when the images were acquired, and a computing device. The computing device is coupled to the image acquisition device and the timekeeping device and has a non-volatile storage device having prestored images, each associated with an employee. The employee timekeeping system has a controller adapted to receive the images acquired from the image acquisition device, and receive a date and time from the timekeeping device when the images were acquired, determine features in the acquired images, search the prestored images for features similar to the features of the acquired images, determine if there is a match closer than a predetermined error, and if so, identifying the employee associated with the matching features.

The controller also determines if the employee is compliant with the company's prestored human resource (HR) rules regarding time and attendance, and stores the employee profile, the date/time of the image acquisition, and clock in information if the features match.

In another embodiment, the controller is further adapted to indicate a start time and an end time of the image acquisition window to acquire images thereby allowing the image acquisition device to acquire images of an employee performing a gesture.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

FIG. 2 is a flowchart illustrating the steps of setting up an employee profile in the employee timekeeping system shown in FIG. 1, prior to clocking the employee in.

DETAILED DESCRIPTION

The employee timekeeping system requires set up of employee profiles before it can be used to identify the employee. During a set up phase, the employee provides identification information to the system and the system creates an employee profile for this employee. In creating the profile, the system acquires at least one image of the employee and their facial features. After the employee profile is finished, it may be used to identify the employee.

When the employee arrives and desires to be clocked in or out, the employee is instructed to perform his/her unique, personalized gesture.

A system camera acquires a full body image of the employee performing his/her clock in gesture in front of the camera for recognition. If the gesture is successfully recognized, the employee is identified. Records on the employee are searched regarding current status, employee type, hours worked, etc. This information is compared to human resource rules to determine if this employee can be clocked in. If so, the official date/time and other clock in information is stored for this employee, and the employee is notified that he/she has successfully clocked in to work. If not, then the employee is notified and no clock in occurs.

If the gesture is not successfully recognized, the employee is alerted and given a predetermined number of additional re-tries.

If employee is still not recognized after the additional re-tries, then additional means of identification are used including either full body recognition or facial recognition, or both. Other conventional means of identification may be used, such as passwords, security questions and text verification with a known cell phone number.

If these all fail, then the system administrator is alerted for assistance.

Figure 1:
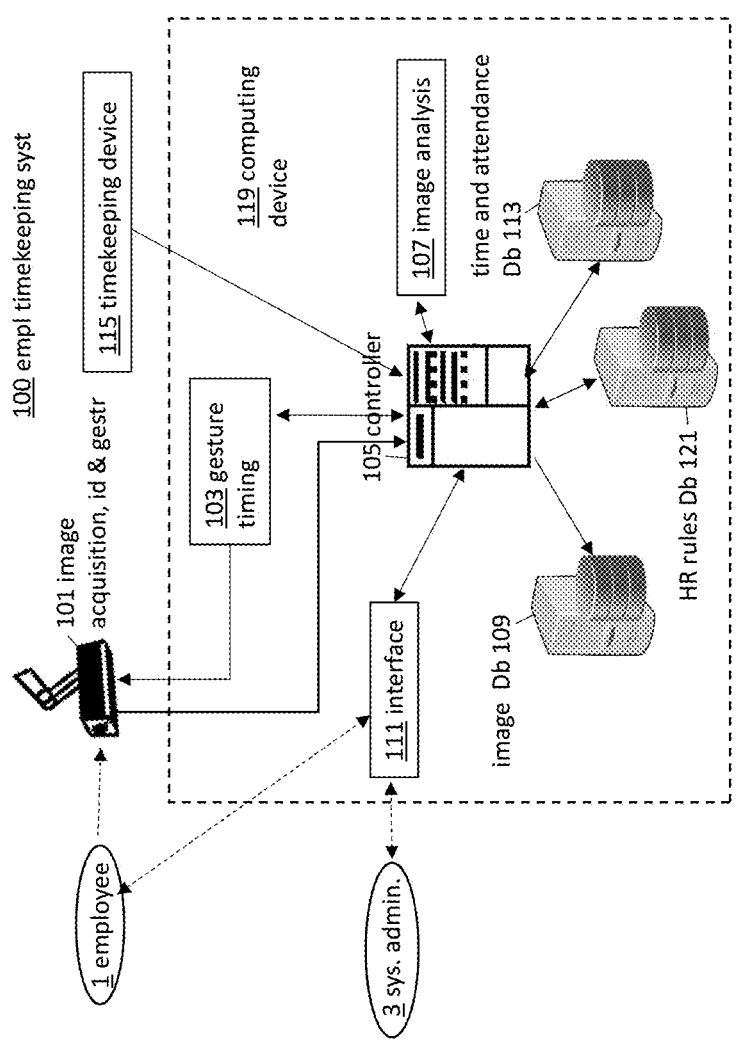
FIG. 1 illustrates a schematic block diagram of an employee timekeeping system in accordance with one embodiment of the present invention.

FIG. 1 illustrates a schematic block diagram of an employee timekeeping system in accordance with one embodiment of the present invention.

Figure 2:
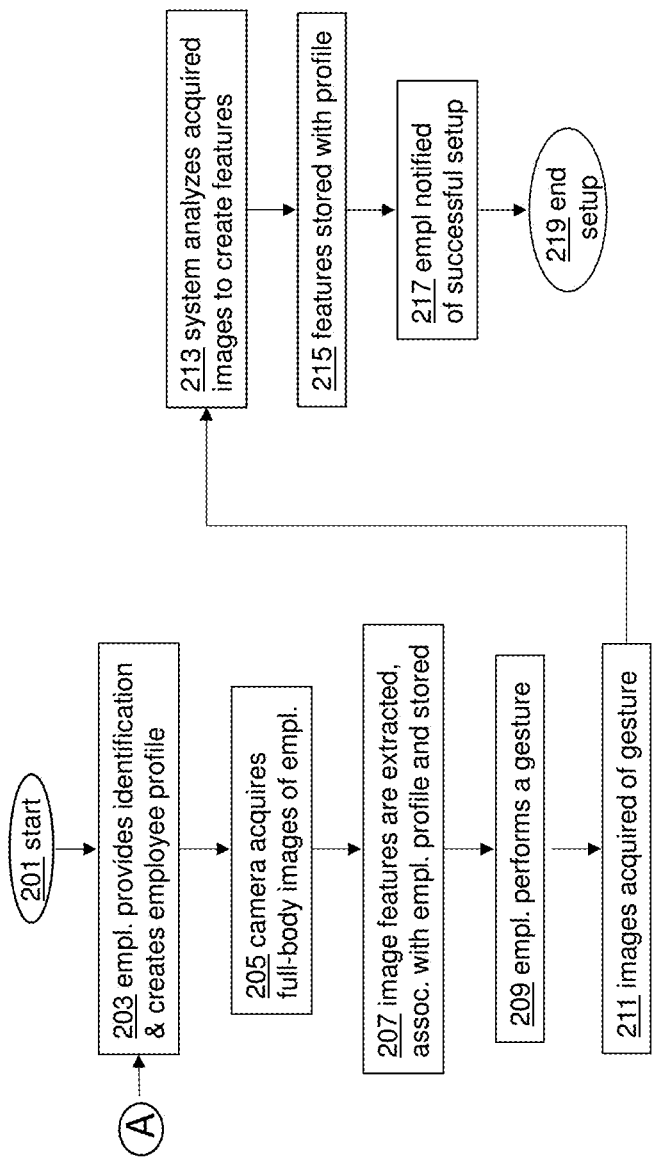

FIG. 2 is a flowchart illustrating the steps of setting up an employee profile in the employee timekeeping system shown in FIG. 1.

The initial set up of the employee timekeeping system 100 will be described in connection with both FIGS. 1 and 2. This initial set up prepares the system for operation.

In step 201 of FIG. 2 the process starts. In step 203 employee 1 interacts with controller 105 to create an employee profile. Employee 1 may provide identification information to a system administrator 3 which interacts with an interface 111 to provide the identification information to controller 105. Controller 105 stores the employee profile in a time and attendance database 113. (The employee profile may be stored anywhere in the system in which it may be retrieved by controller 105; however, it is preferable to store it in the time and attendance database 113.)

The identification information stored may be any type of information which may uniquely identify employee 1. This may be information a) which the employee 'knows', such as Social Security number, driver's license number, answers to security questions, or b) visual features of employee 1.

In step 205, an image acquisition device 101 acquires a full body image of employee 1. In a preferred embodiment, image acquisition device 101 has the ability to determine its distance from the employee 1. Distance from the employee allows one to estimate actual size of features in the images acquired and is important in image recognition and identification of the employee.

In step 207, the full-body image is provided to controller 105 and the passes it to an image analysis device 107. The image analysis device analyzes the full-body image to extract visual features that may be used to match it up against features of other images that have also been stored.

These extracted features are stored in an image database 109 and are associated with the employee 1 in the employee profile of employee 1.

A gesture timing device 103 indicates when the image acquisition device 101 is to begin recording the gesture, and when it is to end recording of the gesture.

In step 209, employee 1 is instructed to start performing the employee's unique gesture in front of image acquisition device 101. Employee 1 may also be instructed when to complete his/her unique gesture.

In step 211, image acquisition device 101 acquires a short video of employee 1 performing his/her unique gesture.

In step 213, the recording of the gesture is provided to controller 105 which passes it to image analysis device 107. Image analysis device analyzes the recording to reduce it to simplified elements and their relative motion to each other. Since the human body has solid structural pieces which are linked together at pivot points, a human gesture can be reduced to the relative motion of these body parts to each other, or to a fixed reference point. Therefore, a gesture may be quickly recognized and matched to features of another gesture.

The analysis of the gesture is then passed back to controller 105 which stores it in image database 109.

In step 215, the analyzed features are stored and associated with the employee profile. In one case they may be stored in the same physical location as the employee profile or in the $2^{nd}$ case they can have a link to the location of the employee profile.

In step 217 the employee is notified that the setup has been successfully completed. In step 219 the setup process is completed for this employee 1.

Figure 3:
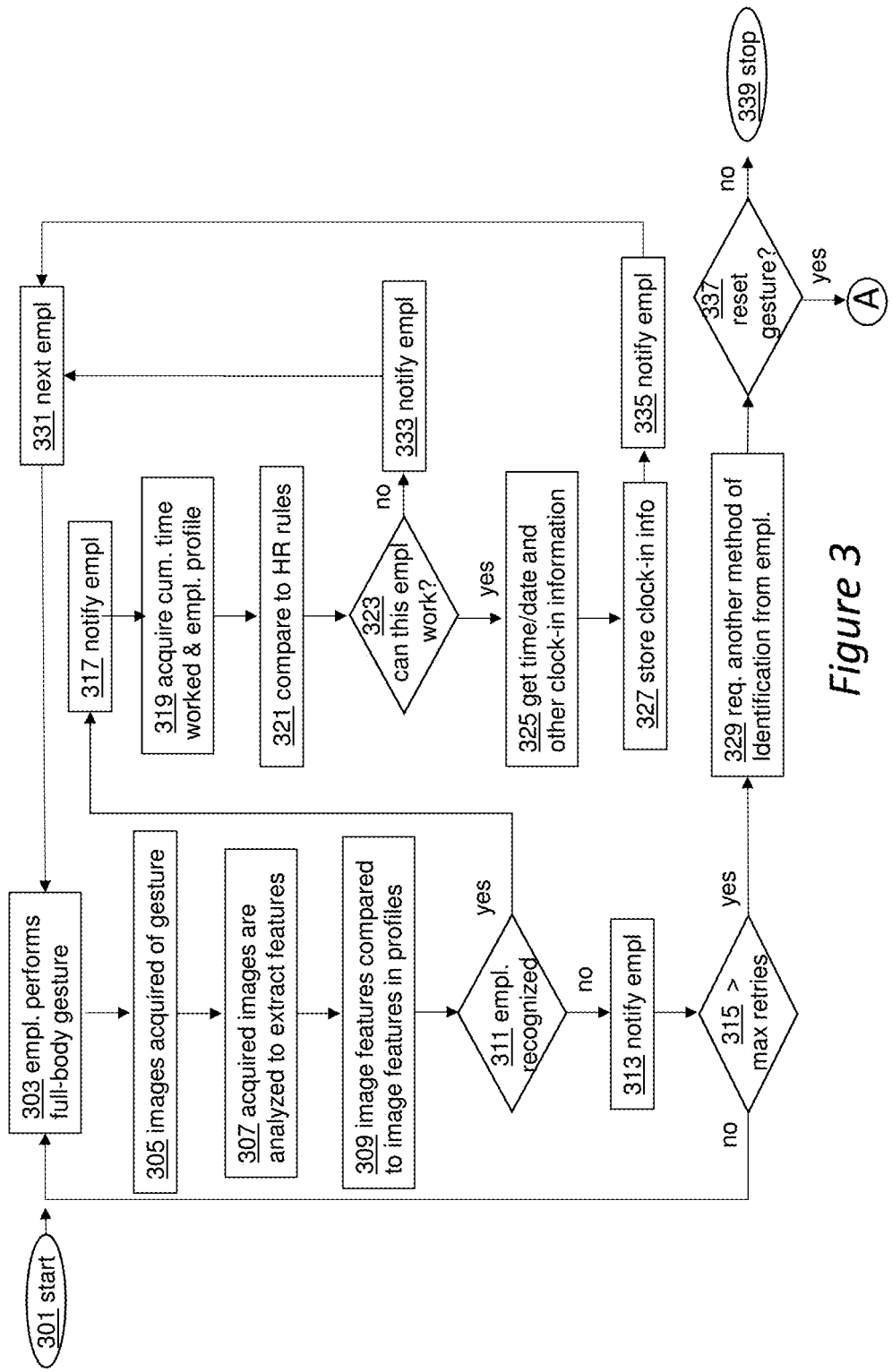
FIG. 3 is a flowchart illustrating the steps of clocking in an employee into the employee timekeeping system of FIG. 1 after setting up the employee profile as shown in FIG. 2.

FIG. 3 is a flowchart illustrating the steps of operating the employee timekeeping system of FIG. 1 after the initial setup shown in FIG. 2. Once the employee 1 has set up his employee profile, the system is ready to clock him/her in. The process starts at step 301 in which employee 1 moves to a location visible to image acquisition device 101.

In step 303, the employee 1 is notified to begin to perform the gesture in front of the image acquisition device 101. Employee 1 then performs the unique gesture which he/she had performed during set up the employee profile.

In step 305 the image acquisition device 101 acquires images of employee 1 performing the gesture. The gesture timing device 103 allows the image acquisition device to acquire images of the gesture when the employee 1 starts the gesture, and stops after the gesture has been completed. This may be done a number of ways, such as by having controller 105 indicate to the employee when to start the gesture, and then activating image acquisition device 101 to acquire the gesture. The image acquisition device 101 then acquires images of the gesture being performed for at least a predetermined length of time. Conventional methods of identifying the beginning and end of a gesture can also be used.

In step 307, images from the image acquisition device are provided to a controller 105 that forwards the images to the image analysis device 107 which analyzes the images to extract unique features in the images.

In step 309 image features from the image analysis device 107 are provided to controller 105 and then compares them to images features stored in image database 109.

In step 311 is determined if the employee's gestures are recognized. Recognition means that features of the acquired images deviate no more than a predetermined amount from features found in image database 109. Deviations less than a predetermined amount may be called a 'match'. If a match is found, the employee 1 is notified in step 317. This notification may be and audible or visual notification form controller 105 through interface 111.

In step 319, controller 105 now knows the identity of employee 1 and looks up information, such as the accumulated time worked by employee 1 in the time and attendance database 113.

In step 321, if the employee is trying to clock in, controller 105 compares information about employee 1 to the rules stored in HR rules database 121 and makes a determination if the employee is allowed to clock in and continue work. If the employee is not allowed to clock in in step 333, the employee is notified and the process then continues in step 331 with a next employee.

If in step 323 the employee can work ("yes"), then in step 325 controller 105 acquires an official time and date from timekeeping device 115, and other information required to clock in employee 1.

In step 327 controller 105 stores the date/time and other information for clocking in employee 1 into time and attendance database 113, and the employee 1 is clocked in. In step 335 the employee is notified that he/she is clocked in and the next employee is then processed beginning at step 331.

In step 311 if the employee is not recognized ("no"), then the employee is notified in step 313. In step 315 it is determined if the employee has tried to clock in more than a maximum number of allowed tries, and if not is allowed to repeat the clock in procedure starting back at step 303.

The employee is notified by the system through interface 111 which may be a screen which displays visual information such as images, text and video, and/or an audible notification, such as an intercom, prerecorded voice, voice synthesizer or audible sounds.

In step 315 if the employee 1 has exceeded the maximum number of retries ("yes"), then another method of identification should be performed starting in step 329.

In step 337, the employee is asked if he/she would like to set up their gesture again. If so ("yes"), then processing continues to the marker "A" in FIG. 2, and processing continues at step 203 of FIG. 2.

In step 337, if the employee would not like to set up his/her gesture again, the process then stops in step 339.

The above invention results in a system which accurately clocks an employee in or out of work that is accurate and entertaining. It allows the employee 1 to use their imagination which tends to increase morale.

However, since image acquisition device 101 acquires a full body image, other aspects of the full-body image may also be used for matching purposes. These may be the overall height to width ratio, arm length, leg length, body shape, eye color, facial features, etc. The confidence used to determine if there is a match may be a function of these and other visual aspects. The system may also have optical character recognition capability and read text appearing on a badge worn by employee 1. Therefore, a match may be determined based upon the totality and closeness that each of the above features match features in the image database 109.

The employee timekeeping system 100 first tries to identify the employee 1 by using various identifications processes starting with the easiest and most entertaining, to the more accurate, but slower identification process.

The employee timekeeping system 100 first tries to identify the employee by the gesture he/she performs in front of the image acquisition device 101, as described above. The relative positions and orientations of appendages of employee 1 are analyzed in their relative motion during the gesture period. These may be compared to gestures stored in image database 109 and determine a deviation from the closest gesture found. The number of common features found and their deviation from a prestored gesture provide the confidence level that there is a match. Once this confidence level exceeds a predetermined value, a match is determined.

If the system cannot identify the employee from the gesture, then the employee may repeat the gesture which is analyzed again. If the first gesture does not produce a match and identify the employee, the process may be repeated a predetermined number of times.

If there still is no match, then the system may try to match features of the full body images to those that have been prestored. This may involve looking for matching body shapes, eye color, hair color, skin tone, relative arm length, relative leg length, posture, etc. Again, there must be at least a predetermined confidence value to determine a match. Other visual features may be used, such as optical character recognition to read a badge of the employee.

If this does not produce a match, then the system may drop back to facial recognition. This is a time-consuming identification means but is more accurate.

If the facial recognition does not produce a match, the system may then request information that the employee 'knows' such as their social security number, driver's license number, or have them answer security questions which they had entered during the profile set up of the employee profile. These may be "What is your mother's maiden name?" or "What is the name of your first pet?"

If the employee cannot answer these questions, the system can revert to texting the employee answers on the mobile phone number stored during setup.

If all else fails, the employee can speak with the system administrator 3.

Although a few examples have been shown and described, it will be appreciated by those skilled in the art that various changes and modifications might be made without departing from the scope of the invention, as defined in the appended claims.

What is claimed is:

1. An employee timekeeping system for keeping track of the work time of an employee, comprising:
an image acquisition device adapted to acquire a plurality of two-dimensional (2D) full-body images of an employee performing a gesture having unique motions during a predetermined acquisition window;
an image analysis device adapted to receive the plurality of 2D full-body images and extract features in the acquired 2D full-body images;
a timekeeping device for providing a date and time when the 2D full-body images were acquired;
a gesture timing device coupled to the image acquisition device, adapted to indicate a start time and an end time of an image acquisition window in which the image acquisition device acquires the 2D full-body images of the employee gesture;
an image database having a plurality of unique prestored features of the plurality of full-body images created by and associated with each employee;
a time and attendance database for storing when each employee started and ended work; and
a controller coupled to the image acquisition device, the image analysis device, the image database and the time and attendance database that:
receives the plurality of 2D full-body images acquired from the image acquisition device,
receives a date and time from the timekeeping device when the 2D full-body images were acquired,
provides the plurality of acquired 2D full-body images to the image analysis device,
receives a set of features from image analysis device,
searches image database for similar sets of features,
determines if the features of the 2D full-body images of the employee gesture match prestored features of a gesture closer than a predetermined error,
identifies an employee associated with the matching prestored features, if there is a match, and
stores the identification of the employee and the date/time of the image acquisition in a time and attendance database, if there is a match;
wherein the controller causes the image analysis device to match features of a plurality of 2D full-body images of the employee gesture to features of a plurality of 2D full-body images previously stored in the image database.

2. The employee timekeeping system of claim 1 further comprising:
an interface that:
receives user input from the employee to positively identify the employee; and
provides the user input to the controller that creates and stores an employee profile.

3. The employee timekeeping system of claim 1 wherein:
the image acquisition device acquires a plurality of 2D full-body images of a gesture of an employee; and
the image analysis device
extracts features from the acquired plurality of 2D full-body images;
compares the features to those stored in all employee profiles to verify that the employee's gesture is unique; and
stores features of the unique gesture in the employee's profile.

4. The employee timekeeping system of claim 1 wherein at least some of the features extracted by the image analysis device indicate bodily motions of the employee performing the gesture.

5. The employee timekeeping system of claim 2 wherein:
the interface is coupled to the controller allowing a system administrator to adjust parameters of the employee timekeeping system.

6. The employee timekeeping system of claim 1, wherein:
the interface also allows the system administrator to adjust the parameters of the image acquisition device.

7. The employee timekeeping system of claim 1 wherein the controller:
repeats the acquisition of 2D full-body images if the features of acquired images are not unique.

8. A method of keeping track of the work time of an employee comprising the steps of:
determining if an employee profile has been stored and if not, then:

acquiring identification information identifying the employee, storing it as an employee profile;

having the employee perform a gesture;

acquiring a plurality of two-dimensional (2D) full-body images of the employee performing the gesture within a time window;

analyzing the plurality of acquired 2D full-body images to extract features;

comparing the extracted features to stored features of other employees to verify that the gesture is unique; and storing the extracted features in the employee profile for this employee if the gesture is unique.

9. The method of claim 8 further comprising the steps of:

determining if an initial profile has been created for this employee, and if so, then:

acquiring a plurality of 2D full-body images of the employee performing a gesture during a predetermined acquisition window;

analyzing the acquired 2D full-body images for features;

comparing the features of the 2D full-body images with image features previously stored in the image database;

determining if there has been a match between the features in the acquired 2D full-body images and the features from the image database, and if so then:

acquiring a date/time of the acquisition of the 2D full-body images and clock in information;

storing the date/time and other clock in information in the time and attendance database;

if there is not a match, then:

repeating the above steps at least one more time starting with the step of acquiring a plurality of 2D full-body images; and using an alternative method of authentication of the employee if a match is not found after repeating the above steps a predetermined number of times.

10. The method of claim 8 wherein the plurality of 2D full-body images comprise 2D full-body images of the employee making bodily motions of a unique gesture to be used to identify the employee.

11. An employee timekeeping system for keeping track of the time worked by an employee, comprising:

an image acquisition device adapted to acquire a plurality of two-dimensional (2D) full-body images of an employee performing a gesture during a predetermined acquisition window when starting and ending work;

a timekeeping device for providing a date and time when the images were acquired;

a computing device coupled to the image acquisition device and the timekeeping device, comprising:

a non-volatile storage device having a plurality of prestored features of the plurality of 2D full-body images, created by and associated with each employee;

a controller that:

receives the plurality of 2D full-body images acquired from the image acquisition device, receives a date and time from the timekeeping device when the images were acquired, interacts with an image analysis device that determines features in the acquired 2D full-body images, interacts with an image analysis device that searches the prestored 2D full-body images for features similar to the features of the acquired 2D full-body images, interacts with an image analysis device that determines if features of the acquired 2D full-body images a match features of prestored images closer than a predetermined error, uniquely identifies the employee associated with the matching features, if there is a match, determines if the employee is compliant with the human resource (HR) rules regarding time and attendance that apply to the employee, and stores the employee profile, the date/time of the image acquisition of the employee starting and ending of the work day, if the features match.

12. The employee timekeeping system of claim 11, further comprising:

a gesture timing device that indicates a start time and an end time of the image acquisition window.

13. The employee timekeeping system of claim 11 further comprising:

an image database having multiple sets of prestored images, each set having features that relate to a gesture that uniquely identifies an employee.

14. The employee timekeeping system of claim 11 wherein:

the plurality of acquired 2D full-body images also include a face of the employee, and the image analysis device also analyzes and determines features of the face of the employee.

15. The employee timekeeping system of claim 11, further comprising:

an interface coupled to the controller allowing a system administrator to adjust parameters of the employee timekeeping system.

16. The employee timekeeping system of claim 15, wherein the system administrator can adjust the parameters of the image acquisition device through the interface.

17. The employee timekeeping system of claim 11, wherein the controller is further adapted to:

repeat the acquisition of a plurality of 2D full-body images of the employee's gesture to use as a prestored image if its features are the same as those for the gesture of another employee.

* * * * *